(12) United States Patent
Doi

(10) Patent No.: US 11,495,423 B2
(45) Date of Patent: Nov. 8, 2022

(54) RESIN MOLDED ARTICLE CONSTITUTING ELECTROSTATIC-CAPACITANCE TYPE OPERATION DEVICE

(71) Applicant: NIFCO INC., Yokosuka (JP)

(72) Inventor: Atsushi Doi, Yokosuka (JP)

(73) Assignee: NIFCO INC., Yokosuka (JP)

( * ) Notice: Subject to any disclaimer, the term of this patent is extended or adjusted under 35 U.S.C. 154(b) by 54 days.

(21) Appl. No.: 17/042,628

(22) PCT Filed: Apr. 24, 2019

(86) PCT No.: PCT/JP2019/017354
§ 371 (c)(1),
(2) Date: Sep. 28, 2020

(87) PCT Pub. No.: WO2019/216215
PCT Pub. Date: Nov. 14, 2019

(65) Prior Publication Data
US 2021/0035756 A1 Feb. 4, 2021

(30) Foreign Application Priority Data

May 9, 2018 (JP) .............................. JP2018-090844

(51) Int. Cl.
*H01H 36/00* (2006.01)
*H01H 1/06* (2006.01)
(Continued)

(52) U.S. Cl.
CPC .............. *H01H 36/00* (2013.01); *H01H 1/06* (2013.01); *H01H 9/02* (2013.01); *H01H 11/06* (2013.01); *H01H 2229/048* (2013.01)

(58) Field of Classification Search
CPC ............ H01H 36/00; H01H 1/06; H01H 9/02; H01H 11/06; H01H 2229/048;
(Continued)

(56) References Cited

U.S. PATENT DOCUMENTS 9,335,871 B2 * 5/2016 Kitano .................. G06F 3/0412
9,385,711 B2 * 7/2016 Sugiura .............. H03K 17/9622
(Continued)

FOREIGN PATENT DOCUMENTS

JP 2009-238661 A 10/2009
JP 2015-130269 A 7/2015
(Continued)

OTHER PUBLICATIONS

PCT/ISA/210, "International Search Report for International Application No. PCT/JP2019/017354," dated Aug. 6, 2019.
(Continued)

*Primary Examiner* — Lheiren Mae A Caroc
(74) *Attorney, Agent, or Firm* — Manabu Kanesaka

(57) ABSTRACT

The resin molded article is molded by using an electrode sheet as an insert in a state where one surface of the electrode sheet is closely attached to an inner surface which serves as the inner side of the operation surface. The electrode sheet is formed by using, as a base material, a thermoplastic synthetic resin sheet which outputs an electrical signal according to the amount of change of electrostatic capacitance generated by a contact operation with respect to the operation surface. At least a whole or a part of the inner surface is formed in a three-dimensionally curved surface, and a passage is formed in the electrode sheet so as to allow a molten resin following in through a gate formed in a die which comes into contact with the other surface of the electrode sheet during molding to pass toward one surface side of the electrode sheet.

1 Claim, 4 Drawing Sheets

(51) Int. Cl.
   *H01H 9/02*    (2006.01)
   *H01H 11/06*   (2006.01)
(58) Field of Classification Search
   CPC ....... H01H 2203/032; H01H 2205/002; H01H 13/14; H01H 11/00; B29C 2045/14532; B29C 2045/1454; B29C 45/14344; B29C 45/14467; B29C 45/14639; B29C 45/14836
   See application file for complete search history.

(56) References Cited

U.S. PATENT DOCUMENTS 9,501,102 B2 * 11/2016 Okawara ............... G06F 1/1643
2010/0052211 A1    3/2010 Chen et al.

FOREIGN PATENT DOCUMENTS

| JP | 2015-162332 A | 9/2015 |
| JP | 2015-166177 A | 9/2015 |
| JP | 2016-81854 A  | 5/2016 |

OTHER PUBLICATIONS

Japan Patent Office, "Office Action for Japanese Patent Application No. 2018-090844," dated Jun. 22, 2021.

* cited by examiner

RESIN MOLDED ARTICLE CONSTITUTING ELECTROSTATIC-CAPACITANCE TYPE OPERATION DEVICE

TECHNICAL FIELD

The present invention relates to the improvement of a resin molded article which constitutes an electrostatic-capacitance type operation device.

BACKGROUND ART

In the electrostatic-capacitance type operation device, there is a device in which an electrode sheet is insert-molded on the side opposite to an operation surface of an operation plate forming an operation surface for contact operation (refer to Patent Literature 1).

However, in a case where the operation plate has a three-dimensional curved surface, if the electrode sheet is not processed at all, the electrode sheet is likely to be wrinkled or broken in a molding process, and thereby a problem such as a decrease in the sensitivity of the electrode sheet occurs.

Such a problem can be solved by providing a plurality of slits in advance on the electrode sheet or by shaping the electrode sheet itself in advance by vacuum compressed air molding so as to imitate the three-dimensional curved surface; however, the former method has a problem in that the design freedom of the electrode sheet is limited by the slit, and the latter method has problems of a cost increase due to an increase in a shaping process and an increase in defective products due to addition of the shaping process, that is, a decrease in yield.

CITATION LIST

Patent Literature

Patent Literature 1: JP 2015-130269 A

SUMMARY OF INVENTION

Technical Problem

A main object to be achieved in the present invention is that an electrode sheet can be appropriately provided in a resin molded article which constitutes an electrostatic-capacitance type operation device by insert-molding without impairing the design freedom of the electrode sheet, and causing an increase in a manufacturing process.

Solution to Problem

In order to achieve the object, in the present invention, there is provided a resin molded article constituting an electrostatic-capacitance type operation device. The resin molded article is molded by using an electrode sheet as an insert in a state where one surface of the electrode sheet is closely attached to an inner surface which serves as an inner side of an operation surface, the electrode sheet being formed by using, as a base material, a thermoplastic synthetic resin sheet which outputs an electric signal according to the amount of change of electrostatic capacitance generated by a contact operation with respect to the operation surface, wherein at least a whole or a part of the inner surface is formed in a three-dimensional curved surface, and a passage is formed on the electrode sheet so as to allow a molten resin flowing in through a gate formed in a die which comes into contact with the other surface of the electrode sheet during molding to pass toward one surface side of the electrode sheet.

As one aspect of the present invention, the passage is used as a through hole.

In this case, as another aspect of the present invention, the through hole is formed substantially in a center of the electrode sheet. Further, as a still another aspect of the present invention, the whole or a part of the inner surface is set as a three-dimensional curved surface having the operation surface side as a curved outer side or is set as a three-dimensional curved surface having the operation surface side as a curved inner side.

Advantageous Effects of Invention

According to the present invention, an electrode sheet can be appropriately provided in a resin molded article which constitutes an electrostatic-capacitance type operation device by insert-molding without impairing the design freedom of the electrode sheet, and causing an increase in a manufacturing process. That is, according to the present invention, it is not necessary to provide the electrode sheet with a slit or the like other than the passage, and the molten resin flowing into the mold through the passage can make the electrode sheet imitate a three-dimensional curved surface without leading to an increase in the manufacturing process.

DESCRIPTION OF EMBODIMENTS

Hereinafter, a typical embodiment of the present invention will be described with reference to FIGS. 1 to 5B. A resin molded article 1 according to this embodiment is formed by insert-molding using an electrode sheet 2 as an insert, and constitutes various electrostatic-capacitance type operation devices by a function of the electrode sheet 2. More specifically, the resin molded article 1 is provided with an operation surface 1a that can be controlled by contact operation, and an electrode sheet 2 as an insert on an inner surface 1c, which is the inner surface of the resin molded article 1, and typically constitutes a main part of various electrostatic-capacitance type operation devices. The electrode sheet 2 is to output an electric signal according to the amount of change in electrostatic capacitance generated by the contact operation with respect to the operation surface 1a, and is formed by using a thermoplastic synthetic resin sheet as a base material, and typically forming a circuit including an electrode for obtaining the electric signal on the base material with a conductive paste (electrode material).

Figure 1:
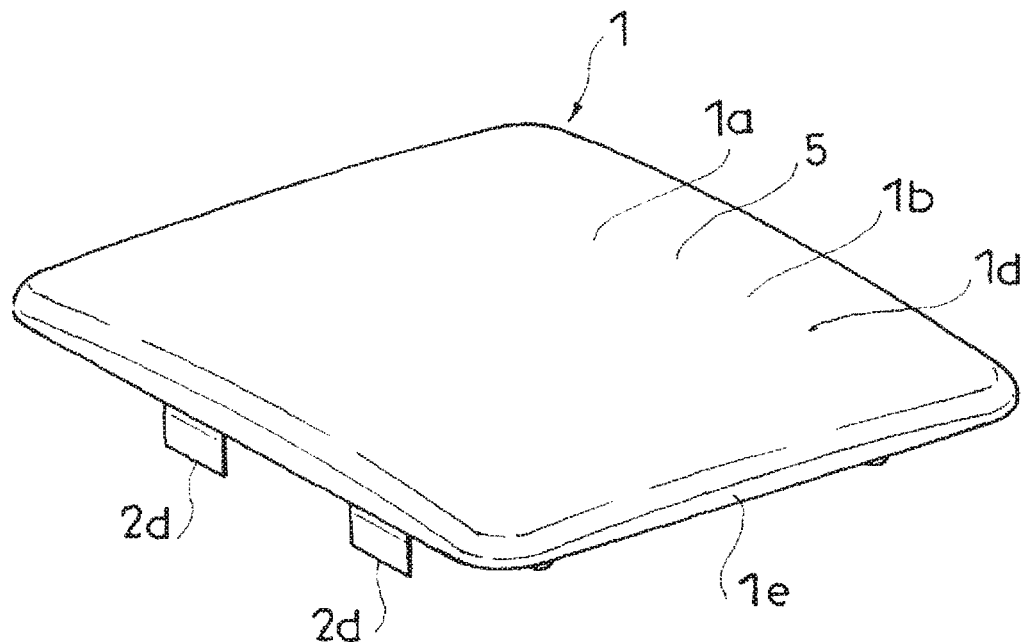
FIG. 1 is a perspective view of a resin molded article according to an embodiment of the present invention, which is viewed from the operation surface side.
Figure 2:
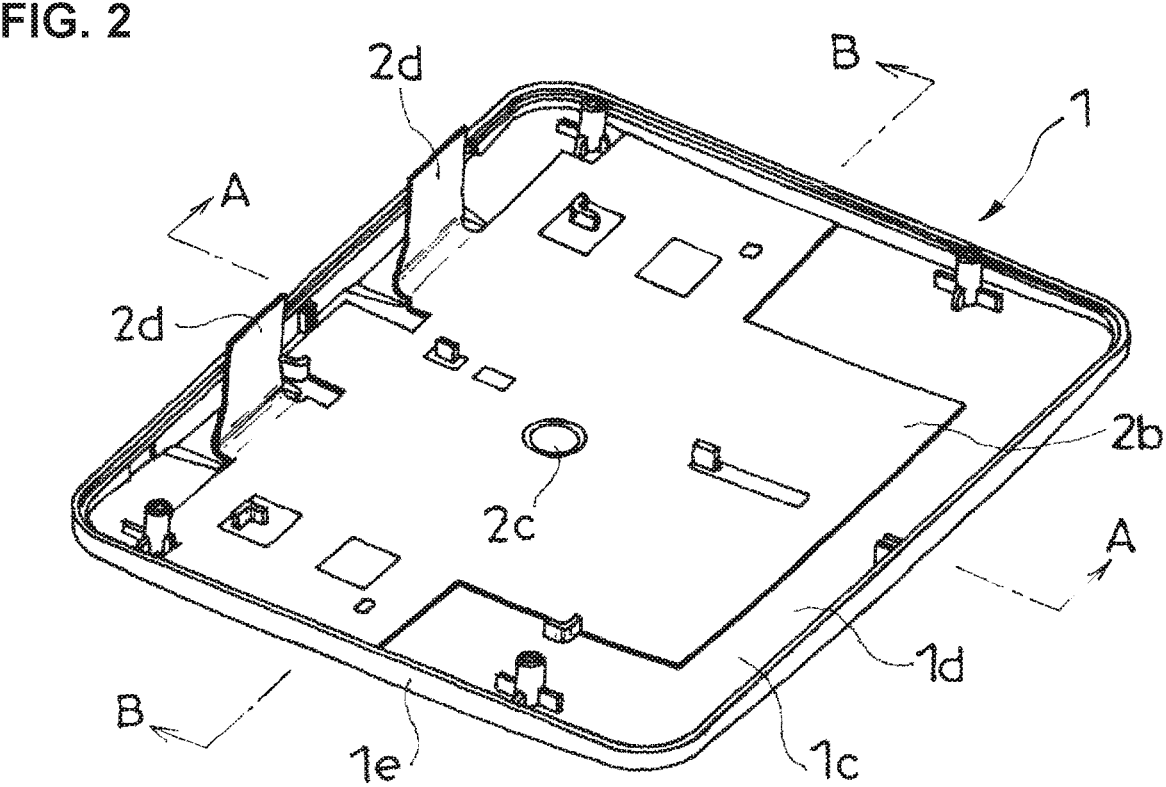
FIG. 2 is a perspective view of the resin molded article, which is viewed from the inner surface side.
Figure 3:
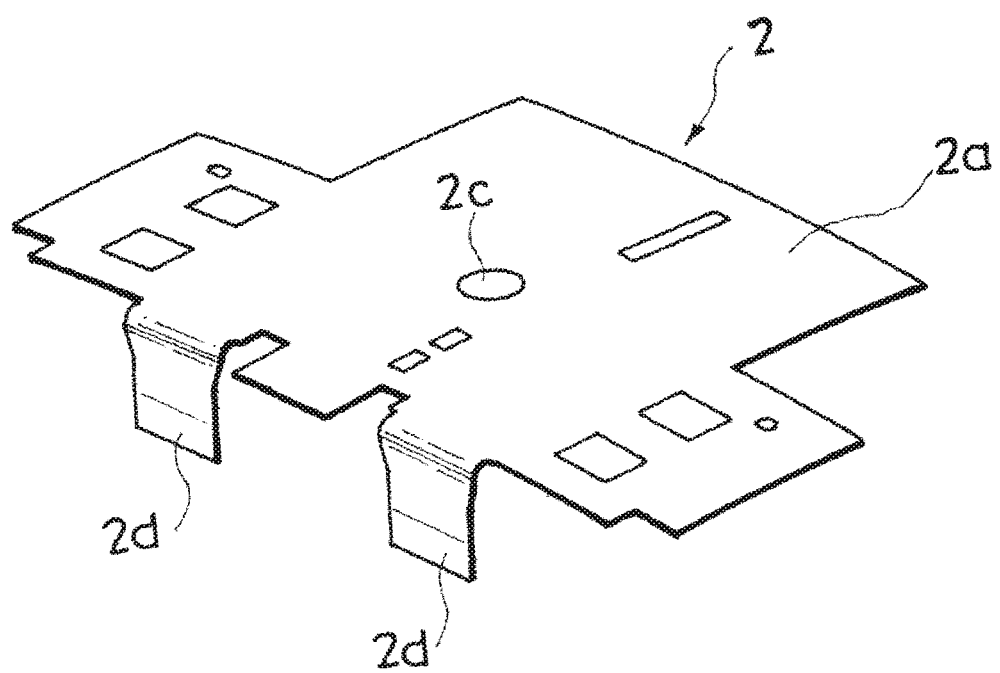
FIG. 3 is an electrode sheet serving as an insert for the resin molded article.

As illustrated in FIGS. 1 and 2, the resin molded article 1 has a configuration in which a circumferential rising portion 1e is formed on an edge portion of a substantially square plate-shaped portion 1d. The forming side of the circumferential rising portion 1e in the plate-shaped portion 1d of the resin molded article 1 is set as an inner surface 1c, and the opposite side is an outer surface 1b as the operation surface 1a. A part 2a of the electrode sheet 2 is brought into close contact with the inner surface 1c by insert-molding. In the illustrated example, the resin molded article 1 is configured such that the outer surface 1b is the design surface of the electrostatic-capacitance type operation device. In particular, it can be used as a lid for various storage bodies as indoor equipment such as automobiles. A desired color, pattern, and figure such as an icon, or the like is provided to the outer surface 1b by a decorative sheet 5 or the like described later, if necessary. For example, an icon indicating a power supply is provided to the outer surface 1b, and when this icon part is controlled by contact operation (touched with a finger, or the like), by making the electrode sheet 2 provided so as to bring one surface 2a into close contact with the inner surface 1c to output a predetermined electric signal, the lid can also be used as a contact operation terminal for various electric devices and electronic devices installed in a room such as an automobile.

Figure 4A:
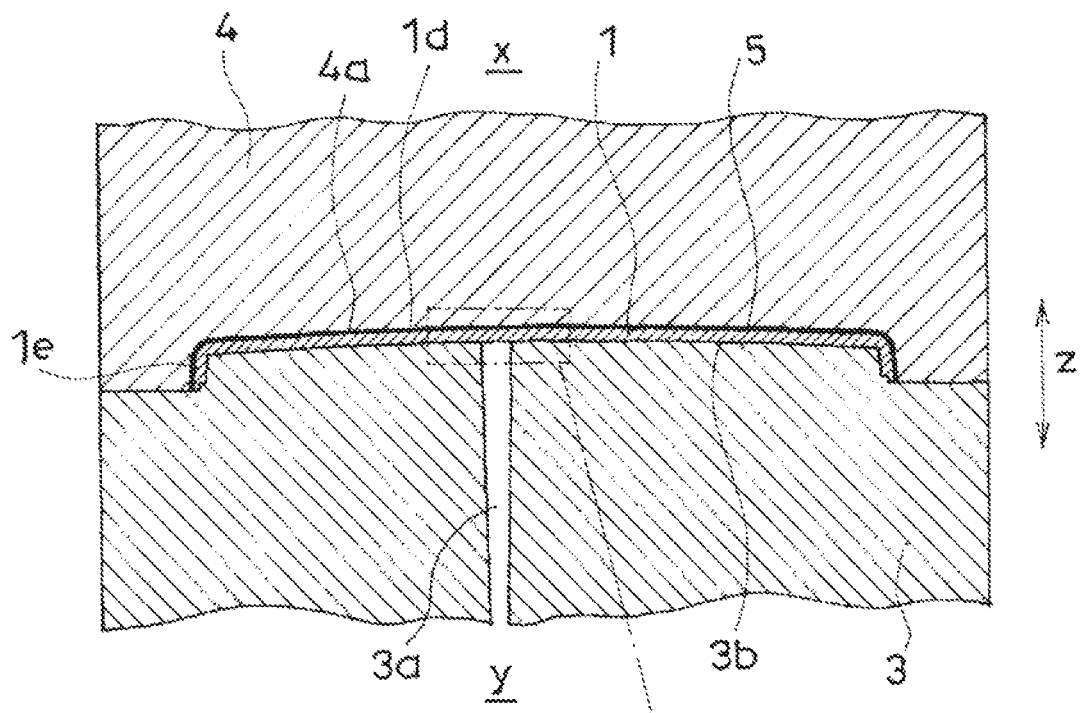
FIG. 4A is a cross-sectional view of the main part at A-A line in FIG. 2, which illustrates a die together.
Figure 4B:
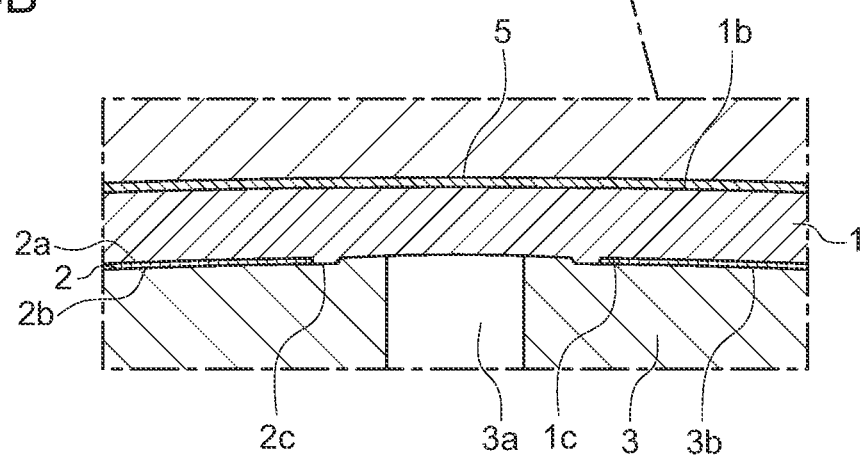
FIG. 4B is an enlarged view of a part thereof.
Figure 5A:
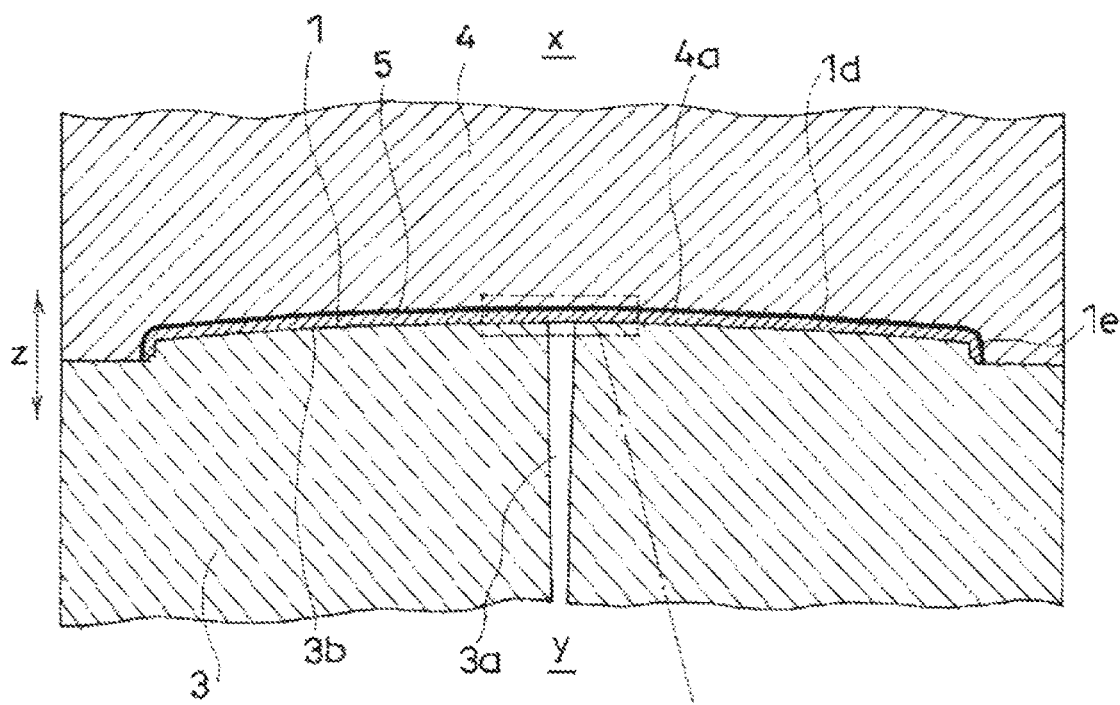
FIG. 5A is a cross-sectional view of the main part at B-B line in FIG. 2, which illustrates a die together.
Figure 5B:
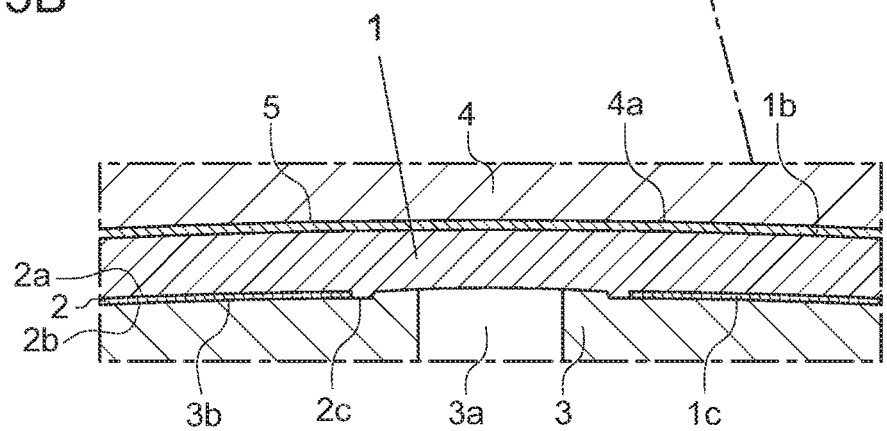
FIG. 5B is an enlarged view of a part thereof.

The resin molded article 1 has a three-dimensional curved surface at at least whole or part of the inner surface 1c. In the illustrated example, the plate-shaped portion 1d has a shape that imitates the three-dimensional curved surface, and both the part as the inner surface 1c and the part as the outer surface 1b in the plate-shaped portion 1d are three-dimensional curved surfaces (FIGS. 4 and 5). In the illustrated example, the inner surface 1c is a three-dimensional curved surface with the operation surface 1a side as a curved outer side x and the opposite side as a curved inner side y. On the contrary, the inner surface 1c may be a three-dimensional curved surface having the operation surface 1a side as a curved inside.

On the other hand, on the electrode sheet 2, a passage 2c is formed to allow a molten resin flowing in through a gate 3a formed in a die 3 in contact with the other surface 2b of the electrode sheet 2 during the molding to pass toward the one surface 2a side of the electrode sheet 2. In the illustrated example, the electrode sheet 2 includes an electrode and a circuit (not shown), and has a size that fits in the plate-shaped portion 1d. In the drawing, reference numeral 2d indicates a part of the electrode sheet 2 extending from the inner surface 1c side of the resin molded article 1, and is a connection tongue piece portion for electrically connecting the electric device, the electronic device, and the like to the circuit on the electrode sheet 2.

The passage 2c is not particularly limited to specific from as long as it allows a molten resin flowing in through a gate 3a formed in a die 3 in contact with the other surface 2b of the electrode sheet 2 during the molding of the resin molded article 1 to pass to the one surface 2a side of the electrode sheet 2. In the illustrated example, the passage 2c is a through hole, and the through hole is a circular hole. Further, the through hole is formed substantially in the center of the electrode sheet 2. The size of the through hole is slightly larger than the opening of the gate 3a (FIGS. 4A-5B), so that it is not necessary to strictly position the electrode sheet 2 when setting it as an insert in a die.

The electrode sheet 2 is integrated with the inner surface 1c in a state where one surface 2a side is embedded in the inner surface 1c and the other surface 2b is exposed.

In a case where the resin molded article 1 is insert-molded using the electrode sheet 2 as an insert in a state where one surface 2a of the electrode sheet 2 is in close contact with the three-dimensional curved surface of the resin molded article 1, since the electrode sheet 2 without any processing cannot follow the three-dimensional curved surface shape of the die corresponding to the three-dimensional curved surface of the resin molded article 1 to be molded, the electrode sheet 2 cannot be properly in close contact with the three-dimensional curved surface shape of the mold. In a case where the electrode sheet 2 is used as an insert without any processing, the electrode sheet 2 is wrinkled or broken. Further, since it becomes difficult to settle the electrode sheet 2 at a predetermined position in the die during the molding, the electrode sheet 2 cannot be properly disposed at a planned arrangement position of the electrode sheet 2 in the resin molded article 1. These situations cause a problem such as a decrease in the sensitivity of the electrode sheet 2, and eventually a problem of electrostatic-capacitance type operation device. In addition, the electrode sheet 2 is likely to peel off from the inner surface 1c of the resin molded article 1 due to aged deterioration. Such a situation is considered to be more remarkable in a case where the resin molded article 1 is used in an electrostatic-capacitance type operation device placed under a condition having a large environmental load such as an indoor equipment of an automobile.

The resin molded article 1 according to this embodiment can be molded in such a manner that in a state where with respect to the three-dimensional curved surface shape 3b corresponding to the three-dimensional curved surface of the resin molded article 1 formed in the die 3 in contact with the other surface 2b of the electrode sheet 2 by the passage 2c formed on the electrode sheet 2, the other surface 2b of the electrode sheet 2 is pressed by the pressure of the molten resin flowing into the one surface 2a side of the electrode sheet 2 through the passage 2c, the electrode sheet 2 whose base material is a thermoplastic synthetic resin sheet is stretched without causing wrinkles or the like so as to imitate the three-dimensional curved surface shape 3b by the flow of the molten resin that flows and spreads on the one surface 2a side of the electrode sheet 2 around the passage 2c. As a result, the resin molded article 1 according to this embodiment can be easily and appropriately manufactured by closely integrating one surface 2a of the electrode sheet 2 with the three-dimensional curved surface of the inner surface 1c of the resin molded article 1 to be molded.

FIGS. 4A-5B illustrate the resin molded article 1 and the dies 3 and 4 for molding the resin molded article 1 together for convenience. The die 3 in contact with the other surface 2b of the electrode sheet 2 has a three-dimensional curved surface shape 3b that molds the inner surface 1c of the resin molded article 1 inside the die. Reference numeral 4 in the drawing is a die for molding the outer surface 1b of the resin molded article 1. In the illustrated example, since the outer surface 1b of the resin molded article 1 is also a three-dimensional curved surface, the die 4 for molding the outer surface 1b of the resin molded article 1 also has a three-dimensional curved surface shape 4a inside the mold. The gate 3a is formed substantially in the center of the inside of the die 3 in contact with the other surface 2b of the electrode sheet 2, and the molten resin flows into the die in the direction along a die release direction z of the die. The through hole as the passage 2c provided on the electrode sheet 2 is also formed at a position substantially center of the electrode sheet 2, and due to the molten resin flowing in from the gate 3a, the electrode sheet 2 is similarly stretched by the flow of the molten resin from the center side of the electrode sheet 2 toward the outer edge portion of the electrode sheet 2 at any position around the passage 2*c*.

In the illustrated example, the decorative sheet 5 is set as an insert on the die 4 side for molding the outer surface 1*b* of the resin molded article 1, and the outer surface 1*b* of the resin molded article 1 is designed to be covered by the decorative sheet 5.

As a matter of course, the present invention is not limited to the embodiments described above, and includes all embodiments that can achieve the object of the present invention.

REFERENCE SIGNS LIST

1 resin molded article
1*a* operation surface
1*c* inner surface
2 electrode sheet
2*a* one surface
2*b* the other surface
2*c* passage
3 die
3*a* gate The entire contents of the specification, claims, drawings and abstract of Japanese Patent Application No. 2018-090844 filed on May 9, 2018 are cited here and incorporated as disclosure of the specification of the present invention.

What is claimed is:

1. A resin molded article constituting an electrostatic-capacitance operation device, comprising:
    a resin sheet having an operation surface, and an inner surface, at least a whole or a part of the inner surface being a three-dimensional curved surface, and
    an electrode sheet arranged to contact the inner surface of the resin sheet, the electrode sheet providing an electric signal according to an amount of change of electrostatic capacitance generated by a contact operation with respect to the operation surface,
    wherein the electrode sheet has a through hole located substantially at a center of the electrode sheet so as to allow a molten resin for forming the resin sheet to flow therethrough,
    a part of the resin sheet is located in the through hole and directly contacts an inner edge of the through hole, and
    the whole of the inner surface of the resin sheet is formed as the three-dimensional curved surface, and the resin sheet has a portion directly contacting the inner edge of the through hole, an inside of the through hole has a surface substantially flush with an inner side of the resin sheet.

* * * * *